United States Patent [19]

Light et al.

[11] Patent Number: 5,021,289

[45] Date of Patent: Jun. 4, 1991

[54] REINFORCED POLYMERIC SHEET MATERIAL

[75] Inventors: Ronald R. Light; Robert W. Seymour, both of Kingsport, Tenn.

[73] Assignee: Eastman Kodak Company, Rochester, N.Y.

[21] Appl. No.: 271,822

[22] Filed: Nov. 15, 1988

[51] Int. Cl.$^5$ .......................... B32B 5/08; B32B 5/26; B32B 17/04; C08J 5/08; C08K 9/06; D04H 1/48

[52] U.S. Cl. .................................. 428/285; 156/228; 264/258; 264/324; 428/288; 428/290; 428/301; 428/302; 428/303; 428/332; 428/340; 428/361; 428/391; 428/429; 428/430

[58] Field of Search ............... 428/285, 288, 290, 301, 428/302, 303, 332, 340, 361, 391

[56] References Cited

U.S. PATENT DOCUMENTS

| | | |
|---|---|---|
| 3,664,909 | 5/1972 | Ackley . |
| 3,684,645 | 8/1972 | Temple et al. . |
| 3,713,962 | 1/1973 | Ackley . |
| 3,850,723 | 11/1974 | Ackley ............................ 156/180 |
| 3,883,333 | 5/1975 | Ackley ..................... 65/2/65/11 R |
| 4,263,364 | 4/1981 | Seymour et al. ................... 428/287 |
| 4,277,531 | 7/1981 | Picone ................................ 428/228 |
| 4,335,176 | 6/1982 | Baumann ............................ 428/228 |
| 4,379,802 | 4/1983 | Weaver et al. ..................... 428/220 |
| 4,699,942 | 10/1987 | Weaver et al. ..................... 524/338 |

OTHER PUBLICATIONS

European Patent Application 86113362.7, Stampable Laminates of Glass Fiber Reinforced Poly(ethylene terephthalate), published 05/06/87.

European Patent Application 86113363.5, Process for Producing Stampable Laminates of Glass Fiber Reinforced Poly(ethylene terephthalate) and Stamped Molded Parts, published 05/13/87.

*Primary Examiner*—James C. Cannon
*Attorney, Agent, or Firm*—John F. Stevens; William P. Heath, Jr.

[57] ABSTRACT

Disclosed is glass fiber reinforced thermoplastic sheet material suitable for various compression molding applications. The glass fibers useful in this invention are described in detail, and the thermoplastic composition is poly(ethylene terephthalate), poly(cyclohexylene dimethylene terephthalate) or a blend of either of these polyesters with each other and/or polycarbonate.

7 Claims, 1 Drawing Sheet

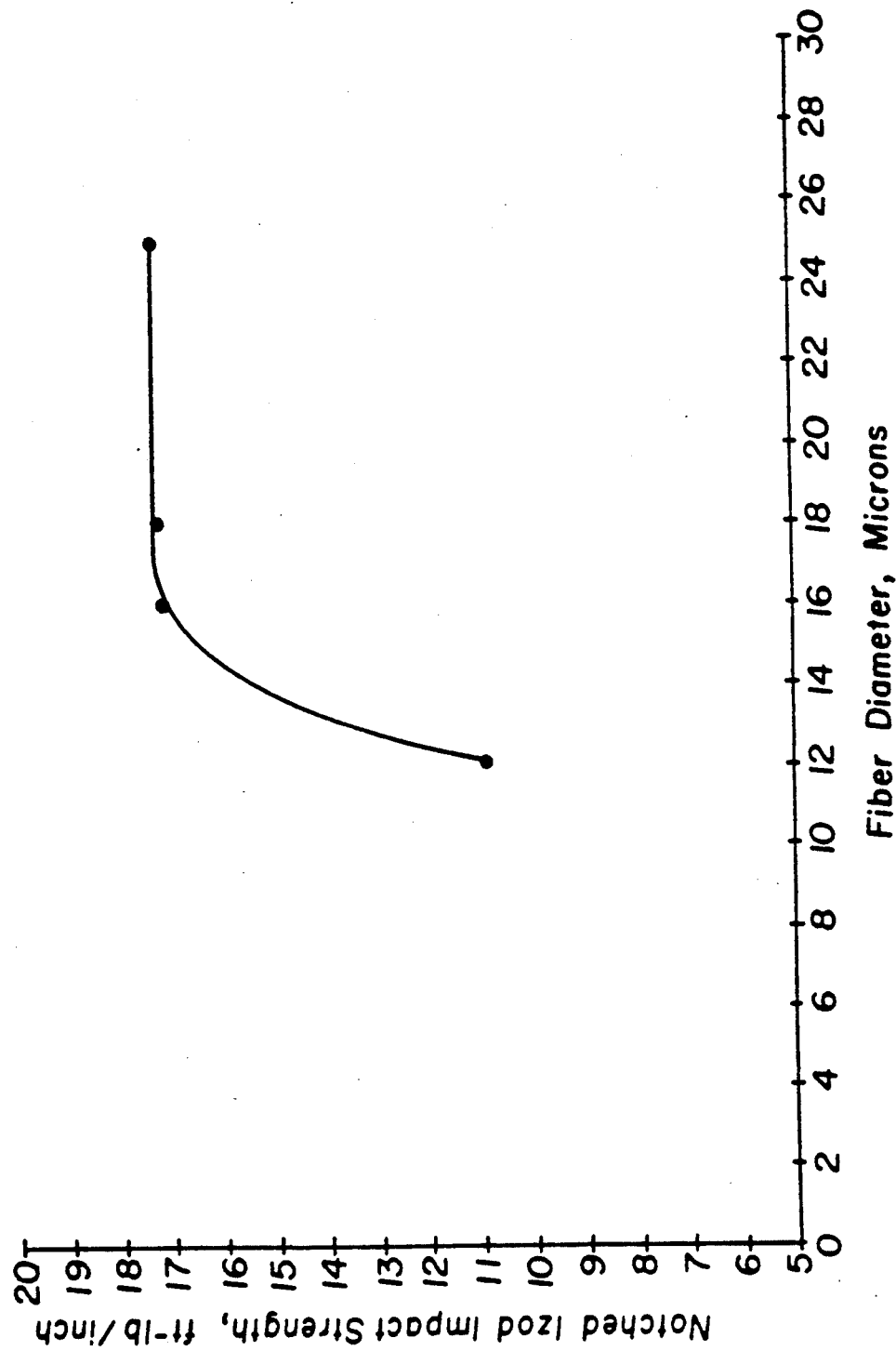

REINFORCED POLYMERIC SHEET MATERIAL

TECHNICAL FIELD

The present invention relates to reinforced polymeric sheet material having an improved combination of physical properties, especially impact strength, which is useful in compression molding various articles such as automobile parts.

BACKGROUND OF THE INVENTION

The production of thermoplastic sheet reinforced with fiberglass mat is receiving considerable attention because of the expected economics in forming high strength, dimensionally stable parts from such a structure. To make the sheet, layers of fiberglass mat are impregnated with molten polymer in either a batch or continuous fashion. A variety of polymers or blends can be used as the matrix for the sheet, with polyolefins and polyesters being the materials of greatest interest. Polyesters, such as poly(ethylene terephthalate) (PET), are preferred for applications where high heat resistance is required. A key property of all these compositions is the impact strength, which desirably is as high as possible, but it is also important to maintain high heat resistance and good formability.

We are familiar with a number of patents dealing with reinforced thermoplastic sheet. Patents of interest include U.S. Pat. Nos. 3,664,909; 3,684,645; 4,277,531; 4,335,176; 3,713,962; 3,883,888; 3,850,723 and European Applications Nos. 86113362.7 and 86113363.5. Other patents include U.S. Pat. Nos. 4,263,364; 4,379,802; and 4,699,942.

BRIEF DESCRIPTION OF THE DRAWINGS

FIG. 1 is a graphical representation of the improved impact strength, as measured by notched Izod, which occurs when reinforcing glass fibers having a diameter of about 14 microns or above are used in the sheet material according to this invention.

DESCRIPTION OF THE INVENTION

According to the present invention, glass fiber reinforced thermoplastic sheet material capable of being thermoformed into parts having improved heat resistance and a notched impact strength of 15 ft-lb/in. or greater is provided, the sheet material being constructed of at least on glass fiber mat having a density of about 1 to 5 oz./ft$^2$ impregnated with a thermoplastic composition, the sheet material comprising:
(a) about 20 to 60 weight % glass fibers in the form of at least one mat, comprising bundles containing about 200 to 300 strands, said strands having a length of about 2 to 10 inches, a diameter of about 14 microns to about 30 microns and having a coating of a glycidal silane or amino silane, and
(b) about 80 to 40 weight % of a thermoplastic composition comprising poly(ethylene terephthalate) or poly(cyclohexylene dimethylene terephthalate) having an I.V. of about 0.4 to about 1.0 and a degree of crystallinity of at least 20%.

According to another aspect of the present invention, the thermoplastic composition further comprises about 0.25% to 2% antioxidant, about 0.1% to 1% nucleating agent, about 0.1% to 1% carbon black and about 0.1% to 2% mold release agent, all based on the total weight of the thermoplastic composition.

According to a further aspect of the present invention, the sheet material comprises at least two glass fiber mats impregnated with a thermoplastic composition, the thermoplastic composition being impregnated therein from between the mats and from both outer sides thereof.

Whether one, two, or several glass fiber mats are used in the sheet material, the glass fiber and thermoplastic composition are proportional such that the finished sheet material contains about 20 to 60 weight %, preferably about 30 to 50 weight % glass fiber and about 80 to 40 weight %, preferably about 70 to 50 weight % thermoplastic composition.

The glass fiber mats are commercially available mats comprising chopped bundles of fibers. The bundles in the mat are about 2 to 10 inches in length, and include about 200 to 300 fibers per bundle. The fiber strands are about 14 to 30 microns in diameter. Normally, the bundles are randomly arranged in the mat and may be needled, as is conventional practice. The mats should have a density of about 1 to 5 oz/ft$^2$.

Preferably, the sheet material further comprises short glass fibers having a length less than 1 inch and a diameter of greater than about 14 microns which are sprinkled into the sheet as the components are compressed.

It is known in the art to provide a sizing of coating on the glass fibers. Applicants, however, have found that a very thin coating of glycidal silane or amino silane is especially useful. Such coated glass fibers are commercially available as Fiberglas ® glass fibers marketed by Owens/Corning.

The thermoplastic compositions useful in the present invention are poly(ethylene terephthalate) (PET) and poly(cyclohexylene dimethylene terephthalate) (PCT) having inherent viscosities of about 0.4 to about 1.0, and a degree of crystallinity of at least 20%. These polyesters are well known in the art and may be prepared using techniques well known in the art. See, for example, U.S. Pat. Nos. 2,465,319, 3,047,539 and 4,536,538. Poly(ethylene terephthalate) is, of course, prepared by reacting terephthalic acid with ethylene glycol and poly(cyclohexylene dimethylene terephthalate) is prepared by reacting terephthalic acid and 1,4-cyclohexanedimethanol. These polyesters may contain minor amounts of repeat units from other conventional dicarboxylic acids and/or glycols, with the total modifications being no more than about 10 mol %. Useful modifying glycols are aliphatic, alicyclic, and aralkyl glycols. Examples of these glycols include ethylene glycol; propylene glycol; 1,3-propanediol; 2,4-dimethyl-2,-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol, 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol.

Useful modifying dicarboxylic acids include aliphatic dicarboxylic acids, alicyclic dicarboxylic acids, aromatic dicarboxylic acids, or mixtures of two or more of these acids. Examples of such dicarboxylic acids include succinic; glutaric; adipic; azelaic; sebacic; fumaric; maleic; itaconic; 1,4-cyclohexanedicarboxylic; phthalic, terephthalic and isophthalic.

It has also been found that blends of these polyesters with each other and/or with polycarbonate are useful thermoplastic compositions, wherein the composition contains about 10 to 50 weight % polycarbonate.

Polycarbonate resins which are suitable for use in the present invention are well known in the art and are generally commercially available. These polycarbonates may be prepared by a variety of conventional and well known processes which include transesterification, melt polymerization, interfacial polymerization, etc. The polycarbonates are generally prepared by reacting a dihydric phenol with a carbonate precursor, such as for example phosgene. Suitable processes for preparing the polycarbonates of the present invention are described in, for example, U.S. Pat. Nos. 4,018,750, 4,123,436 and 3,153,008. However, other known processes for producing polycarbonates are suitable. Particularly preferred polycarbonates are aromatic polycarbonates, prepared by reacting bisphenol-A [2,2-bis(4-hydroxyphenyl) propane] with phosgene.

Similarly, the poly(cyclohexylene dimethylene terephthalate) resins of the present invention are commercially available and are based on copolymerization reactions between 1,4-cyclohexane dimethanol and terephthalic acid or an ester forming derivative thereof. Ester forming derivatives include simple esters of acids such as methyl esters and ethyl esters and acid halides such as chloro and bromo acid halides.

The mold release agent, polyethylene having a molecular weight (weight average) of about 500 to 2000, is commercially available. Suitable polyethylenes include Polywax 500, 655, 1000, and 2000, marketed by Petrolite Corporation. Polywax 1000 polyethylene (molecular weight of 1000) is preferred.

The nucleating agent, talc having a particle size of about 0.5 to 40 microns, is also commercially available. Suitable nucleating agents include Microtalc talc, marketed by Pfizer, Inc. Such talcs typically contain at least 90% silicon and magnesium oxide and minor amounts of calcium oxide, aluminum oxide, and ferric oxide. They are characterized by platy grain shape.

The carbon black having a particle size of about 12 to 75 microns is commercially available. One suitable carbon black is Regal 660 marketed by Cabot Corporation.

The hindered phenol anitoxidants are also commercially available. One suitable hindered phenol is Irganox 1010 antioxidant, marketed by Ciba-Geigy. Its chemical name is tetrakis[methylene 3-(3',5'-di-tert-butyl-4'-hydroxyphenyl)propionate]methane.

Other hindered phenols useful in the present invention include 1,3,5-tris(3,5-di-tert-butyl-4-hydroxybenzyl)-5-triazine-2,4,6-(1H, 3H, 5H)trione; 3,5-di-tert-butyl-4-hydroxyhydrocinnamic acid triester with 1,3,5-tris(2-hydroxyethyl)-S-triazine-2,4,6-(1H, 3H, 5H)trione; octadecyl 3,5-di-tertbutyl-4-hydroxyhydrocinnamate; thiodiethylene bis(3,5-di-tert-butyl-4-hydroxy) hydrocinnamate; N,N'-hexamethylene bis(3,5-di-tert-butyl-4-hydroxyhydrocinnamamide); 1,6-hexamethylene bis(3,5-di-tertbutyl-4-hydroxyhydrocinnamate); 1,3,5-trimethyl-2,4,6,-tris(3,5-di-tert-butyl-4-hydroxybenzyl)benzene; 2,4-bis(n-octylthio)-6-(4 hydroxy-3,5-di-tert-butylanilino)-1,3,5-triazine; n-octadecyl 3,5-di-terbutyl-4-hydroxyphenylacetate; 1,3,5-tris(4-tertbutyl-3-hydroxy-2,6-dimethylbenzyl)-1,3,5-triazine-2,4,6-(1H, 3H, 5H)trione; 2,2'-methylenebis(4-ethyl-6-tert-butylphenol); 2,2'-methylenebis(4-methyl-6-tert-butylphenol); 4,4'-methylenebis(2,6-di-tert-butylphenol); 4,4'-thiobis(6-tert-butyl-o-cresol); 3:1 condensate of 3-methyl-6-tert-butylphenol and crotonaldehyde; 4,4'-butyldienebis(6-tert-butyl-m-cresol)3,5-di-tert-butyl-4-hydroxybenzyl ether; 2,2'-oxamidobis ethyl3(3,5-di-tert-butyl-4-hydroxyphenyl)propionate; stearyl β-(3,5-di-tert-butyl-4-hydroxyphenyl) propionate; distearyl 3-methyl-4-hydroxy-5-tert-butylbenzyl malonate; 4,4'propylmethylenebis(2-tert-butyl-5-methylphenol); 2,2'-propylmethylenebis(4,6-dimethylphenol); 2,2'-methylenebis(4,6'-di-tert-butylphenol); 1,4-bis(3',5'-di-tert-butyl-4'-hydroxybenzyl)-2,3,5,6-tetramethylbenzene; 1,1-bis(3'-cyclohexyl-4'-hydroxyphenyl)cyclohexane; 2,6-bis(2'-hydroxy-3'-tert-butyl-5'-methylphenyl)-4methylphenol; 2,4,6-tris((β-(3',5'-dibutyl-4'-hydroxyphenyl)ethyl)-1,3,5-triazine; 2,4,6-tris(3',5'-di-tert-butyl-4'-hydroxybenzyl)-phenol.

The thermoplastic composition may be produced by blending the additives individually or in combination into the polyester in a conventional manner, such as by melt blending. It is preferred, however, to produce a polymer concentrate using the polymer as a carrier, in which the additives are blended in concentrated amounts. Various polymers can be used so long as processing and physical properties of the final polyester compositions are not affected. A preferred concentrate is described as follows:

(A) poly(ethylene terephthalate) or poly(1,4-cyclohexylene dimethylene terephthalate), (B) a mold release agent consisting essentially of about 2.5% to 7.5%, based on the weight of polyester, of polyethylene having a molecular weight of about 500 to 2000, (C) a nucleating agent consisting essentially of about 2.5% to 7.5%, based of the weight of the polyester, of talc having a particle size of about 0.05 to 40 microns, (D) about 1.5% to 4.5%, based on the weight of the polyester, of carbon black having a particle size of about 12 to 75 microns, and (E) an antioxidant consisting essentially of about 5% to 20%, based on the weight of polyester, of a hindered phenol of the general formula

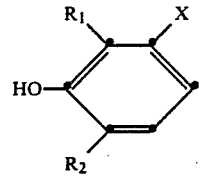

wherein $R_1$ is a branched alkyl group containing 3 to 20 carbon atoms, $R_2$ is H or a straight or branched alkyl group containing 1 to 20 carbon atoms, and X is an alkyl group or an electron donating group of a molecular weight which provides said hindered phenol with a volatility rate of less than 20% by weight after 6 hours at 230° C.

Reference is made to FIG. 1 which illustrates the dramatic increase in notched Izod impact strength between about 12 and 14 micron in diameter of the glass fibers.

In the production of the sheet material, layers of polyester and glass fiber may be superimposed and heated, compressed and cooled between two platens, the temperature of which can be controlled. Since the production of accurate and rapid temperature changes in such platens is difficult, the layers are preferably superimposed by feeding a layer of polyester and a mat of fibrous reinforcing material into a nip formed between two moveable members which advance the superimposed layers through a heating and/or cooling zones in which the temperature of the layers can be controlled.

The layer of polyester may be fed into the nip in the form of a sheet of solid polyester. In this arrangement the superimposed layers would initially be advanced through a heating zone in which the polyester is melted and then through a cooling zone. Alternatively the layer of polyester may be fed into the nip in molten form directly from an extrusion device.

The nip may be formed by a plurality of pairs of heat conductive rolls, the temperature of which can be controlled so that if necessary the superimposed layers are heated between a first set of rolls to a temperature sufficient to melt the polyester, and then rapidly cooled between a second set of rolls. A release agent is preferably applied to the rolls to facilitate removal of the layers therefrom as they pass along the nip.

Suitable equipment incorporating such rolls or belts is readily available and will be familiar to those skilled in the art.

In order to ensure that the reinforcing material does not accumulate undesirably close to the surface of the sheet material, the layers of polyester and reinforcing material are preferably arranged so that a layer of reinforcing material is sandwiched between two layers of polyester. If desired, a plurality of layers of reinforcing material may be incorporated in the sheet. In such a case, each layer of reinforcing material is preferably sandwiched between two layers of polyester.

The sheet material containing polyester may be formed into an article of any desired shape using conventional compression molding equipment.

The polyester compositions may also be used in conjunction with glass fiber in a manner described in detail in U.S. Pat. No. 4,277,531, incorporated herein by reference.

The thermoplastic compositions useful in the present invention may also include conventional additives such as impact modifiers, flame retardants, etc.

The following examples are submitted for a better understanding of the invention.

In all of the following examples, the matrix polymer consists of PET containing 1% Irganox 1010 antioxidant, 0.5% talc nucleating agent, 0.1% Polywax 1000 mold release agent and 0.3% carbon black. Alternating sheets of PET (I.V.=0.65) and fiberglass mat are laid up in the following construction

|  |  |
| --- | --- |
| ~~~~~~~~~~~~~~~~ | PET |
| XXXXXXXXXXXXXXXXXXXX | Fiberglass |
| ~~~~~~~~~~~~~~~~ | PET |
| XXXXXXXXXXXXXXXXXXXX | Fiberglass |
| ~~~~~~~~~~~~~~~~ | PET | and compressed at 275° C. for two minutes to impregnate the PET melt into the fiberglass mat. At the end of the two minutes, the samples are transferred to a second press maintained at 150° C., where they are held under pressure for two minutes to crystallize. Test bars are then cut from the plaques for physical testing.

Mats with the following characteristics were used:

| Example | Fiber Diameter, (Microns) | Fiber Lengths (Inches) |
| --- | --- | --- |
| I. | 12.0 | 3 (67%) |

-continued

| Example | Fiber Diameter, (Microns) | Fiber Lengths (Inches) |
| --- | --- | --- |
|  |  | 4 (33%) |
| II. | 14.8 | 3 (67%) |
|  |  | 4 (33%) |
| III. | 18.7 | 4 (67%) |
|  |  | 9 (33%) |
| IV. | 25.7 | 4 (67%) |
|  |  | 9 (33%) |
| V. | 25.7 | 9 (67%) |
|  |  | 4 (33%) |

All mats are 3 ounce/sq. ft. in density.

Physical property results are shown in Table I, and the dependence of notched Izod impact strength on fiber diameter is plotted in FIG. I. From the results it may be seen that the Izod impact strength is greatly enhanced when the fiber diameter is about 14 microns or greater. A further useful result of the invention is that other important mechanical properties, such as tensile and flexural strengths, are maintained at high levels regardless of the fiber diameter. The other components of the composition are required to give improved oxidative stability during molding and in use (the antioxidant), improved moldability (nucleating agent and mold release), and color uniformity and UV protection (carbon black).

TABLE I

Mechanical Properties of PET Reinforced Sheet

| PROPERTY | EXAMPLE | | | | |
| --- | --- | --- | --- | --- | --- |
|  | I | II | III | IV | V |
| Tensile Strength, $10^3$ psi | 15.9 | 13.9 | 12.6 | 14.0 | 13.5 |
| Elongation, % | 7 | 6 | 5 | 5 | 5 |
| Flexural Modulus, $10^6$ psi | 1.1 | 1.3 | 1.2 | 1.14 | 0.93 |
| Flexural Strength, $10^4$ psi | 2.23 | 3.09 | 2.97 | 2.53 | 2.18 |
| Notched Izod Impact, ft-lb/in. (23° C.) | 10.6 | 19.1 | 17.9 | 17.6 | 18.3 |
| Unnotched Izod Impact, ft-lb/in. (23° C.) | 15.1 | 21.3 | 23.5 | 24.1 | 19.8 |
| Glass Content, weight % | 30.2 | 32.6 | 31.6 | 36.4 | 35.8 |

Tensile Strength ASTM D638-80
Elongation ASTM D638-80
Flexural Modulus ASTM D790-80
Flexural Strength ASTM D790-80
Izod Impact ASTM D256-81

As used herein, the inherent viscosity (I.V.) is measured at 25° C. using 0.50 g of polymer per 100 mL of a solvent consisting of 60% by weight phenol and 40% by weight tetrachloroethane.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. Glass fiber reinforced thermoplastic sheet material capable of being thermoformed into parts having improved heat resistance and a notched impact strength of 15 ft-lb in. or greater, said sheet material being constructed of at least one glass fiber mat having a density of about 1 to 5 oz/ft$^2$ impregnated with a thermoplastic composition, said sheet material comprising (a) about 20 to 60 weight % fibers in the form of matted bundles containing about 200 to 300 strands, said strands having a length of about 2 to 10 inches, a diameter of about 14 microns to about 30 microns and having a coating of a glycidal silane or amino silane, and (b) about 80 to 40 weight % of a thermoplastic composition comprising poly(ethylene terephthalate) or poly(cyclohexylene dimethylene terephthalate) having an I.V. of about 0.4 to about 1.0, a degree of crystallinity of at least 20%.

2. Sheet material as described in claim 1 wherein the thermoplastic composition comprises a blend of about 1 to 99 weight % poly(ethylene terephthalate) and about 99 to 1 weight % poly(cyclohexylene dimethylene terephthalate).

3. Sheet material described in claim 1 wherein said thermoplastic composition comprises about 10 to 50 weight % polycarbonate.

4. Sheet material according to claim 1 which further comprises glass fibers having a length of less than about 1 inch and a diameter of greater than 14 microns.

5. Sheet material according to claim 1 comprising at least two glass fiber mats.

6. Sheet material according to claim 1 which further contains, based on the weight of the composition, about 0.25% to 2% antioxidant, about 0.1% to 1% nucleating agent, about 0.1% to 1% carbon black and about 0.1% to 2% mold release agent.

7. Sheet material according to claim 6 wherein said antioxidant is tetrakis[methylene 3-(3',5'-di-tert-butyl-4'-hydroxyphenyl)propionate]methane, said nucleating agent is talc and said mold release agent is polyethylene having a molecular weight of about 500 to 2000.

* * * * *